Sept. 11, 1962 T. W. MOORE 3,054,041
CHARGING SYSTEM FOR SILVER ZINC BATTERIES
Filed Aug. 13, 1959 2 Sheets-Sheet 1

INVENTOR.
THOMAS W. MOORE
BY
*Stewart F. Moore*
ATTORNEY

Sept. 11, 1962 T. W. MOORE 3,054,041
CHARGING SYSTEM FOR SILVER ZINC BATTERIES
Filed Aug. 13, 1959 2 Sheets-Sheet 2

INVENTOR.
THOMAS W. MOORE
BY
ATTORNEY

United States Patent Office 3,054,041
Patented Sept. 11, 1962

3,054,041
CHARGING SYSTEM FOR SILVER
ZINC BATTERIES
Thomas W. Moore, Dayton, Ohio, assignor to American Machine & Foundry Company, a corporation of New Jersey
Filed Aug. 13, 1959, Ser. No. 833,480
12 Claims. (Cl. 321—19)

This invention relates to a system for producing and controlling a direct current output from an alternating current input source and, in particular, to a novel system for charging an electric storage battery. It is particularly adapted for use in the charging of silver-zinc or nickel-cadmium type batteries.

Storage batteries of the type having silver-zinc electrodes and an alkaline electrolyte are difficult to charge because of the unique electrochemical characteristics of the battery. Thus, an important characteristic of such a battery, its extremely low internal resistance, often as low as .005 ohm, creates problems not normally encountered in the charging of batteries of the lead-acid type. For example, with such a low internal resistance, the existence of a one volt differential between the terminal voltage of the battery and charger would cause a 200 amp. current to flow through the charging system during the charging cycle. It such a battery, in a completely discharged state, were connected to a charger, then an extremely high current of thousands of amperes would result and, for practical purposes, the current flow would be limited only by the internal impedance of the generator itself.

Additionally, it has been found that the charging characteristic of the usual silver-zinc battery requires that the battery be charged at relatively low currents, on the order of 30 to 50 amps. Charging at higher currents progressively reduces the efficiency of the charge cycle due to the formation of higher silver oxides which produce local circulating currents within the battery cell itself. Furthermore, if the battery is charged at too high a line voltage, gassing in the cell results which causes excessive heating and the additional formation of higher silver oxides which ultimately destroy the battery electrodes themselves. Accordingly, the battery must also be charged under closely controlled voltage conditions, so that the terminal voltage is maintained at a prescribed value.

In the case of nickel-cadmium batteries, the charging problems are similar to those of silver-zinc but not quite as severe due to the slightly higher internal resistance of such batteries.

Accordingly, it is an object of the invention to provide a charging system for charging a battery under closely controlled current conditions to prevent damage to the charger and battery and also to produce the most efficient charge cycle.

It is another object of the present invention to provide a battery charging system for charging a battery at a substantially constant current until rated terminal voltage is developed, whereupon the charging cycle is completed at constant voltage.

It is a further object of the invention to provide a battery charging system having control means for limiting the output of the charging system when either the current or voltage conditions of a battery being charged exceed a predetermined value.

It is yet another object of the invention to provide a battery charging system having means for supplying a minimum output current in the event of a partially shorted, or dead battery.

It is a still further object of the invention to provide a battery charging system having means for separately and independently controlling the voltage and current output of the system, which means is responsive to the voltage and current requirements of a battery being charged.

As the batteries for which the present battery charging system is adapted to be used are usually employed in aircraft because of their high output and low weight characteristics, the charging system must be capable of being accommodated in an aircraft environment. However, operation of a battery charging system in an aircraft poses special problems peculiar thereto, such as adaptability to wide temperature variations, minimum component size, minimum radio noise interference, and minimum deterioration of the A.C. waveform of the aircraft electrical system by the charging system.

It is therefore another object of the invention to provide a battery charging system particularly adaptable for operation and use in an aircraft environment, and having features which provide an advantageous solution to the problems peculiar to successful operation therein.

The circuit arrangement of the present invention includes novel circuitry for reducing to a minimum, undesirable harmonics reflected into the power source of the charging system, even though waveform deteriorating, saturable reactors are used in the power control stages of the charging system. The circuit arrangement of the present invention further includes novel circuitry for reducing to a minimum, radio noise internally generated by the charging system and also provides multiple functions for certain of the components in order to minimize the size of the charging apparatus. The circuit arrangement also includes temperature compensating means for the sensitive control units in order to provide stable operation under widely varying conditions of environmental temperature changes.

In general terms, the battery charging system of the present invention includes a transducer circuit which provides a voltage proportional to charging current, and an output voltage sensing circuit which provides a voltage proportional to the output voltage. Both the current-related voltage and the output-related voltage are compared to a standard reference voltage, also provided by the system. Means, responsive to the first one of these voltages to equal the reference voltage, are provided for controlling the output of a saturable reactor preamplifier which, in turn, controls a power magnetic amplifier, which regulates the power input to the charger. An important feature of the invention is the provision of means associated with the controlled preamplifier for preventing over-current or over-voltage charging of a battery.

For a better understanding of the invention, together with other and further objects thereof, reference is made to the following detailed description taken in connection with the accompanying drawings, in which.

Figure 1:
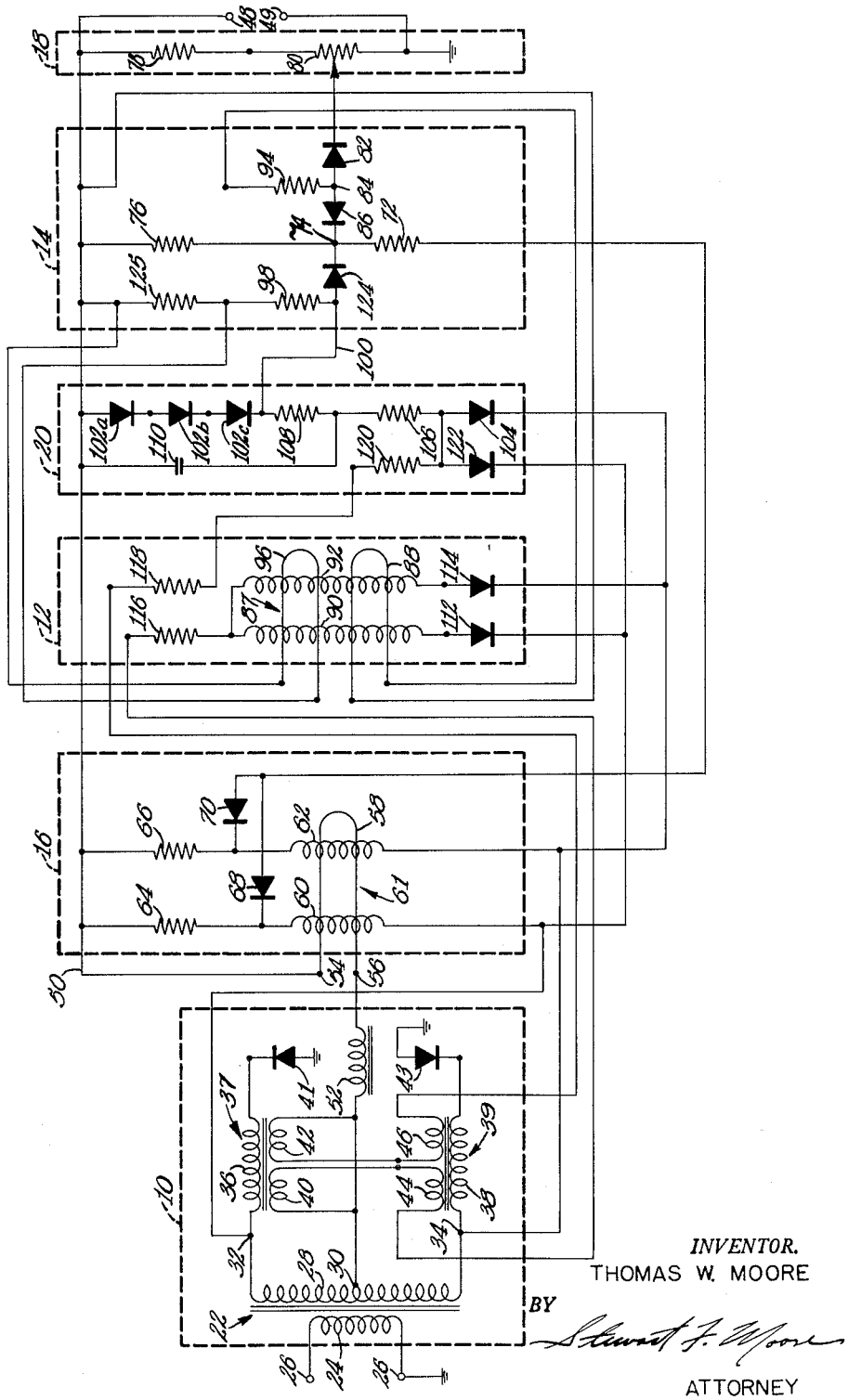
FIG. 1 is a schematic showing of an embodiment of the present invention for use with a single-phase power system.

Referring now to FIG. 1, a preferred arrangement of a single-phase system for producing and controlling a direct current output is illustrated as comprising in general, a main power unit 10, a preamplifier unit 12, a logic unit 14, a current sensor 16, a voltage sensor 18 and a reference voltage source 20.

Power unit 10 has a transformer 22 with a primary winding 24 connectable to an A.C. source, which for aircraft applications is preferably 115 v., 400 cycles, by means of terminals 26, one of which may be grounded.

The secondary winding 28 has a terminal 30 connected to the center tap thereof and A.C. output terminals 32, 34 connected to the outer ends of the secondary winding 28. The power unit 10 has a pair of saturable reactors 37, 39, each of which has a power winding 36, 38, one end of which is respectively connected to terminals 32, 34. The other ends of power windings 36, 38 are respectively connected to diode rectifiers 41, 43, which have a common terminal connected to ground. Where space is a consideration and must be economized, such as in aircraft applications, rectifiers 41, 43 may be semiconductor diodes, preferably of the silicon type. Rectifiers 41, 43 are of the type having an anode connected to the housing therefor and maintained at ground potential. In this manner, the rectifier may be connected solidly to structural chassis elements, thereby requiring no electrical insulation with an attendant thermal drop. Thus, the rectifiers may operate at the lowest possible temperature rise and may be positioned in the charger assembly at a point where maximum cooling may be effected.

Each power reactor 37, 39 has a pair of control windings 40, 42 and 44, 46, respectively. Windings 40, 44 are connected in series with each other and to preamplifier 12 and, similarly, windings 42, 46 are connected in series with each other and likewise connected to preamplifier 12. The operation of these windings will be discussed in more detail hereinafter.

It will be seen that power supply 10 is of the type having full wave rectification, with a positive output voltage available at center tap connection 30 and with output power controllable by saturable reactors 37, 39.

The positive D.C. output voltage available at center tap connection 30 is supplied to output terminal 48 through line 50 which is connected in series with smoothing inductor 52 and center tap terminal 30 of power unit 10. Also connected in series with line 50 and inductance 52 are input terminals 54, 56 of current sensor 16, in order that the current being drawn by the load connected to output terminals 48, 49 may be sensed thereby. Connected to the input terminals 54, 56 of current sensor unit 16 is a control winding 58 which, schematically, is shown as a single winding but which, in practice, may comprise one or more control windings for saturable reactor 61 which has secondary or gate windings 60, 62.

Gate windings 60, 62 are each connected respectively to terminals 32, 34 of power unit 10 and through associated load resistors 64, 66, to output line 50. Rectifiers 68, 70 are respectively to gate windings 60, 62 and also have a common junction connection through resistor 72 to junction terminal 74 in logic unit 14. Terminal 74 is connected to line 50 through a resistor 76 which, coacting with resistor 72, forms a voltage divider. As the A.C. output of saturable reactor 61 is converted to D.C. by rectifiers 68, 70, it will be seen that a D.C. voltage is available at junction 74 which is proportional to the current passing through control winding 58 and is therefore proportional to the current of the battery being charged, or of any other suitable load connected between output terminals 48, 49. In the absence of any current being drawn through control winding 58 and a corresponding lack of D.C. excitation of reactor 61, the A.C. impedance of the reactor becomes high enough to prevent the development of a voltage of significant magnitude across resistors 64, 66. However, upon the presence of load current in control winding 58, the cores of the associated saturable reactor windings 60, 62 are driven into saturation during a portion of the A.C. cycle thereby developing a voltage across load resistors 64, 66 which is approximately proportional to load current. Since this voltage is rectified by diodes 68, 70, a D.C. voltage is developed across resistors 72, 76, which is proportional to line current. The voltage then available at junction 74 is compared with a voltage provided by output voltage sensor 18 in a manner which will now be described.

Connected across terminals 48, 49 are serially connected resistors 78, 80. Resistor 80 may be an adjustable potentiometer which has its adjustable contact connected through a diode 82 to junction point 84. A diode 86 is also connected to junction points 84 and 74. A control winding 88 of saturable reactor 87 of preamplifier unit 12 is connected in series with resistor 94 between line 50 and junction point 84. Saturable reactor 87 has a pair of secondary or gate windings 90, 92 whose output impedance is controlled by winding 88.

It will be seen that the excitation of control winding 88 is derived from a selected portion of the output voltage which is developed across resistors 78, 80 through diode 82 and resistor 94. By adjustment of the slidable contact of resistor 80, the excitation may be set at any desired value. The excitation of the control winding is therefore proportional to a voltage representative of the magnitude of the output voltage and thus the terminal voltage of the battery being charged. As mentioned hereinabove, a voltage proportional to line current also appears at terminal 74, which is compared with the sampled line voltage appearing at junction 84. The resultant voltage excites control winding 88. Whichever of the two voltages is higher will cause its associated diode, either 82 or 86, to conduct and control the charger output as will be described in more detail, while the other voltage is effectively neglected.

For example, assume that the charger is operating as a voltage regulator. Under these circumstances the line current is quite low and the voltage developed across resistor 76 is insignificant. Therefore, the current fed to the control winding 88 of saturable reactor 87 flows through resistor 94 and through diode 82 to the adjustable point on resistor 80 whereby the charging system is voltage controlled. Assume now that the line current drawn by the load is gradually increased so that the voltage across resistor 76 which is proportional to line current, increases accordingly. As soon as the voltage across resistor 76 exceeds that at the junction point 84, diode 86 conducts. The control current passing through the control winding 88 then takes an alternate path through diode 86 and resistor 72. In this instance, the charger becomes current controlled in a manner described in more detail below, while the voltage sensing circuit 18 has negligible effect.

For comparison purposes, it is necessary to provide logic unit 14 with reference information relating to the charging specifications and voltage and current limits of the system. For this purpose, a second control winding 96 for saturable reactor 87 of preamplifier unit 12 is connected through a resistor 98 to a source of standard reference voltage supplied by reference unit 20 through line 100.

Reference unit 20 may comprise any suitable source of unvariable standard voltage, for example, a plurality of standard cells. However, it is preferable in the interest of weight and space economy, and particularly for aircraft or military applications where ruggedness and reliability are important factors, that the standard reference source be generated internally by the charging system itself. In accordance with these objectives, the present invention provides an extremely stable reference voltage through the use of novel circuitry which will now be described.

The zener characteristic of certain semiconductor diodes, such as those formed from silicon, may be used advantageously to provide a source of constant voltage. Accordingly, one or more zener diodes 102a, 102b, 102c may be connected in series with each other and to a source of positive operating potential in order to supply a constant voltage output to line 100. In one application of the present invention, three zener diodes having a 7 volt breakdown characteristic were connected in series to provide a 21 volt reference source.

Operating potential for the zener diodes is provided by rectifying a portion of the output voltage of transformer 22 by means of diode rectifiers 104, 122 and connecting their outputs in a full wave rectifier arrangement through serially connected resistors 106, 108 to the serially connected zener diodes 102a, 102b, 102c. A capacitor 110 may be connected across zener diodes 102a, 102b, 102c and resistor 108 in order to provide filtering action. The exciting voltage for winding 96, developed between line 100 and ground is therefore maintained at a constant value, as established by the zener diodes irrespective of line voltage variations or other factors.

The magnitude of the exciting, or reference current for winding 96 is determined by resistor 98. The polarity of winding 96 is such that magnetic amplifier 87 is normally driven far into saturation, or into a fully conducting condition. Conversely, the polarity of winding 88 is such that current passing therethrough tends to drive the saturable reactor preamplifier 87 in the opposite direction or towards an unsaturated condition. A state of balance or equilibrium will be reached when the M.M.F. in each of the control windings balances the other. By proper adjustment of the various circuit components, it is preferable that this state of equilibrium be reached when rated terminal voltage has been detected by voltage sensor 18 and translated into an exciting current for winding 88, as described above.

Preamplifier unit 12 will now be described in more detail. One end of each of gate windings 90, 92 of preamplifier saturable reactor 87 are connected together, while the other ends are respectively connected each to diode rectifiers 112, 114 which, in turn, are connected to terminals 32, 34 of transformer 22. The joined ends of gate windings 90, 92 are connected through a resistor 116 to serially connected control windings 40, 44 of power reactors 37, 39. The free end of winding 40 is returned to center tap terminal 30. A controllable bias current for control windings 40, 44 is thus provided, and its magnitude is adjusted by resistor 116.

In operation, any variations in the magnitude of the mmf. established by control winding 92 of saturable reactor 87, which deviate from the reference M.M.F. established by winding 96, will be reflected as a change in excitation current through control windings 40, 44 of the power reactors 37, 39. Any increase or decrease in this excitation current will cause a corresponding variation in the conduction angle of each cycle of the A.C. voltage presented to rectifiers 41, 43, with the output power supplied to terminals 48, 49 varying accordingly.

M.M.F. balancing for power saturable reactors 37, 39 is secured by means of separate balancing windings 42, 46 in a manner similar to the M.M.F. balancing of preamplifier saturable reactor 87. Excitation current for windings 42, 46 is provided by serially connecting windings 42, 46 to center tap 30 and to a current limiting resistor 118 which is connected through a resistor 120 to diodes 104, 122. The polarity of windings 42, 46 is such that power saturable reactors 37, 39 are normally biased towards an unsaturated condition so that power supply 10 tends to have a minimum output voltage. This condition is opposed by the M.M.F. generated by windings 40, 44 which are connected to preamplifier saturable reactor 87 and have a polarity opposite to windings 42, 46. The exciting current in windings 40, 44 is preferably adjusted to supply enough additional excitation to drive reactors 37, 39 into a fully saturated condition to maximize the A.C. conduction angle.

Figure 3:
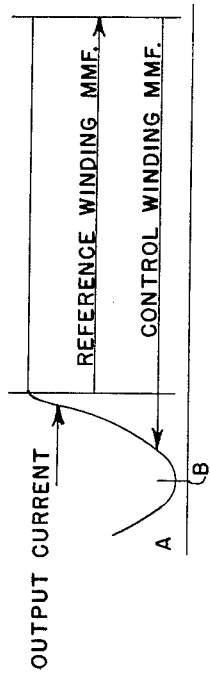
FIG. 3 is a characteristic curve diagram of a conventional saturable reactor.

An important feature of the present invention is the provision of means for preventing the drawing of excessive load current from the charging system in the event that the battery has several shorted cells or if the battery is almost fully discharged. While the load current under such abnormal battery conditions will cause the output voltage to fall below the specified minimum operating range, yet saturable reactor 61 of current sensor 16 even when completely desaturated, is capable of passing currents in excess of normal. As this reactor provides a voltage at junction 74 proportional to such an excessive load current, then without current limiting means, it is possible for an excessively large exciting current to appear in control winding 88 of preamplifier saturable reactor 87, causing saturation in a direction reverse from normal operation which ultimately results in overcontrol of the charging system in the wrong direction. This reverse action is due to the output current-control M.M.F. characteristic of saturable reactors. A characteristic curve diagram illustrating this relationship is shown in FIG. 3 where it will be noted that the transfer curve of output current vs. control M.M.F. is somewhat S-shaped. As long as preamplifier 87 is controlling either current or voltage, the M.M.F. of windings 88 and 96 are approximately equal, except that the M.M.F. of control winding 88 will always be slightly the larger of the two since it must cancel the M.M.F. of the reference winding 96, and in addition provide for desaturation of the core of saturable reactor 87. However, if the current delivered to winding 88 is considerably in excess of normal for the reasons given above, it will produce an M.M.F. which will drive saturable reactor 87 beyond the point B (FIG. 3) and into area A. In this case, the control function is reversed and any subsequent attempt to balance the M.M.F.'s will be in the wrong direction. Under these circumstances the charging system would deliver maximum output and would stay in this condition as long as the load is connected.

The drawing of excessive load current beyond a predetermined maximum is prevented by diode 124 connected between junction point 74 and resistor 98. Whenever the voltage across resistor 76 approaches an undesirable level because of excessive load current being drawn through control winding 58 of saturable reactor 61 in current sensor 16, diode 124 conducts and clamps this voltage to the low impedance zener reference voltage level, the additional voltage being dissipated harmlessly across resistor 72. By this means, function reversal cannot occur, and under abnormal conditions the output of the system is limited to that of a fully desaturated saturable reactor. The actual value of load current will then depend upon the voltage, frequency and impedance of the system; the impedance and voltage of the battery being charged; and the line voltage drop, but will be very much less than if reactor 87 were in a fully saturated state under such abnormal conditions.

In practice, therefore, the normal voltage developed across resistor 78 in voltage sensor 18 is slightly less than that of the voltage provided by the zener reference diodes 102a, 102b, 102c. Current control will dominate over voltage control within this differential but the differential cannot be exceeded because of the clamping action just described.

For a better understanding of the operation of the charger, assume that a partially discharged battery is connected to terminals 48, 49 for charging, that the charging system is operating as a voltage regulator, and that the output voltage is too low. Under these conditions, the M.M.F. developed by winding 88 will be less than that of winding 96 due to the low proportion of terminal voltage developed across the resistor 80. Therefore, the flux developed by reference control winding 96 will override that developed by winding 88 and will drive the secondary windings 90, 92 of saturable reactor 87 into full saturation. This process will cause a relatively high current to flow in the control windings 40, 44 of power saturable reactors 37, 39, which current will be more than enough to balance the reference current in windings 42, 46. The output voltage of the system will then increase due to saturation of reactors 37, 39. The operation progresses until the battery terminal voltage increases to a fully charged state whereupon the currents in windings 96 and 88 of preamplifier reactor 87 reach a balance. Of course, if the terminal voltage is very low and excessive current is demanded by a battery which is substantially fully discharged, the current will be limited as described above, to a pre-set value by the clamping action of the voltage provided by reference source 20, in conjunction with diode 124 which establishes a voltage across resistor 76. The voltage applied to windings 92 then cannot exceed the clamp voltage regardless of the current demands of the battery being charged.

When the voltage developed across terminals 48, 49 becomes slightly higher than normal, indicating that a fully charged condition has been reached, the M.M.F. developed by winding 88 is sufficient to completely counteract that developed by winding 96 and therefore cut off the output of the preamplifier saturable reactor 87. This action causes power saturable reactors 37, 39 to operate in an unsaturated condition and thereby reduce the output of the entire system.

The problem of a positive drift in the values of certain components of reference unit 20 with an increase in ambient temperature becomes increasingly important in environmental locations of the system where operating temperature may become excessively high, such as in aircraft applications. A net positive increase in reference voltage values will result in the charging of a battery above rated terminal voltage, with possible damage thereto.

For example, it has been found that the output voltage of certain zener diodes adaptable for use as diodes 102a, 102b, 102c of reference unit 20 will increase as much as 5% per 100° C. Additional changes in other elements, such as a change in the forward conduction characteristics of diodes 82, 86, 124, changes in the width of the hysteresis loops of the several saturable reactors and in the values of some of the circuit resistors which normally have a zero temperature coefficient all contribute to a net positive reference voltage drift. In one uncompensated model of the present invention, such a drift amounted to approximately 6% of the reference voltage under high temperature conditions.

To prevent such a drift, a zero temperature coefficient resistor 125 is connected across the input terminals of control winding 96 of saturable reactor 82. As the temperature increases, the magnitude of the reference voltage supplied to winding 96 also increases, due chiefly to an increase in the zener output voltage of diodes 102a, 102b, 102c and to a lesser extent, to the other factors discussed above. Since resistor 125 has a zero temperature coefficient, it will pass a greater proportion of current as the voltage across winding 96 increases with temperature. But, as the resistance of winding 96 also increases with temperature, the proportion of the total current flowing through the winding decreases as the temperature increases. By adjusting the value of resistor 125 until there is no change with temperature in terminal voltage appearing at terminal 48, 49 under fully charged conditions, temperature compensation over a wide range is achieved.

Figure 2:
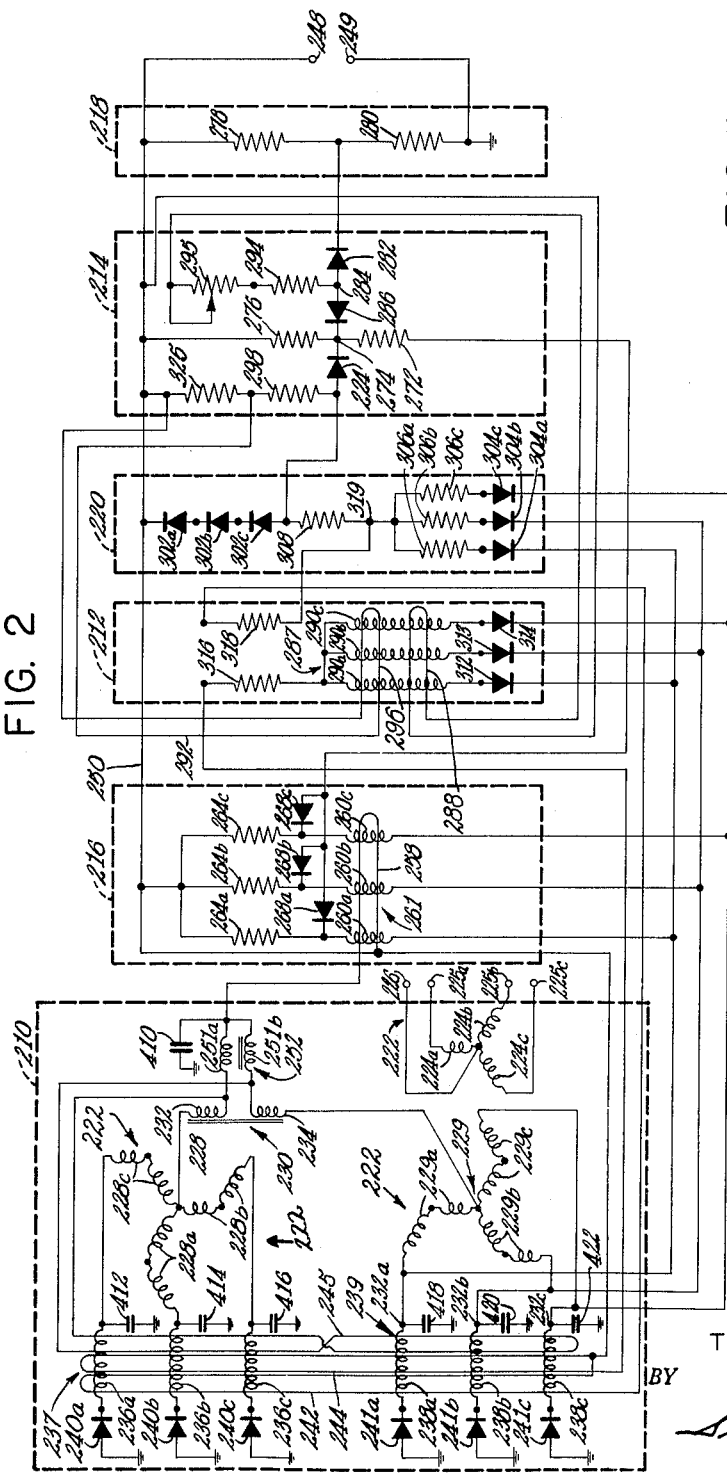
FIG. 2 is a schematic illustration of a modification of the present invention for use with a three-phase power system.

The features of the three phase embodiment of the invention shown in FIG. 2 which are unique to three phase operation will now be described in detail. Where the circuit elements of the three phase embodiment are similar to the single phase embodiment of FIG. 1, like reference numerals in the 200 series have been used to identify similar components. Where operation of such components or major units is substantially similar between the two embodiments illustrated herein, only a brief description has been made in the interest of brevity.

In general, the major units of the three phase embodiment comprise a power unit 210, a preamplifier unit 212, a logic unit 214, a current sensor 216, a voltage sensor 218, and a reference voltage source 220.

In more detail, power unit 210 has a three phase input transformer 222 which has a Y-connected primary comprising windings 224a, 224b, 224c and a double zig-zag, Y-connected secondary comprising individual phase windings 228a, 228b, 228c and 229a, 229b, 229c, respectively.

By utilizing a Y-connected primary, a center tap line 226 connected to the common junction point of windings 224a, 224b, 224c is provided. Thus, in the event of a power failure on any of the lines connected to terminals 224a, 224b, 224c, the charger will operate at least satisfactorily until the failure condition has been corrected.

The secondary windings 228a, 228b, 228c and 229a, 229b, 229c are connected in a zig-zag arrangement in order to aid in reducing unwanted input line harmonics.

Further harmonic reduction is realized by connecting the common junction point of winding 228 to one end of winding 232 of interphase transformer 230 and the common junction point of windings 229 to winding 234 of interphase transformer 230. The function of the interphase transformer is to intermix the outputs of the two neutral systems of input transformer 222 so that each element can conduct for 120° of the cycle in a parallel manner rather than for 60°, as would result from normal sequential firing with the neutrals connected in common. The function of the interphase transformer reaches its greatest significance when the conduction angle is at a maximum and is relatively ineffective at low conduction angles. It has been found that line harmonic content may be reduced to an insignificantly small figure by a ratio heretofore not possible by adjusting both the air gap and the stacking height of the laminations of the transformer core to cause saturation thereof so that the conduction angle of the current carried by the transformer 230 is limited to substantially no greater than 85% of the maximum figure of 120° for each alternation of the three phase system. It was found in practicing the invention that the use of an interphase transformer, having an adjusted air gap and reduced number of laminations, resulted in a significant reduction in its weight and size, and approximately a two to one improvement in harmonic content, as reflected into the input line circuits.

Secondary windings 229 have A.C. output terminals 232a, 232b, 232c connected to one end thereof to provide a source of A.C. voltage for preamplifier unit 212, current sensor 216 and reference voltage source 220. Power unit 210 has a pair of saturable reactors 237, 239, each of which has power windings 236a, 236b, 236c; 238a, 238b, 238c connected respectively to transformer secondary windings 228a, 228b, 228c and 229a, 229b, 229c. To the other ends of power windings 236a, 236b, 236c and 238a, 238b, 238c are respectively connected diode rectifiers 240a, 240b, 240c and 241a, 241b, 241c, which have a common terminal connected to ground.

The characteristic of a three phase A.C. to D.C. converter which utilizes two secondary neutral lines connected by a conventional interphase transformer and saturable reactor power output control is that one of the secondaries with its associated rectifiers tends to either assume a major part of the load current or reject it almost entirely with the result that during operation of the converter, a sudden switching action occurs from one set of rectifiers to the other. Then if the bias M.M.F. of the magnetic amplifier controlling the branch having the greater load is gradually adjusted in the proper direction toward equal load distribution, the load carrying portion of the secondary power supply system suddenly switches and places the major portion of the load on the alternate system. Readjustment of the bias for rebalance generally results in a recurrence of the phenomena.

This unwanted effect may be completely corrected by providing a filter inductor 252 which has two windings 251a, 251b in coaxial disposition about the inductor core or wound in a bifilar arrangement, if desired. Each winding 251a, 251b has a common connection to line 250 with its other end, respectively connected to windings 232, 234 of interphase transformer 230. As a result, any increase in current of one secondary neutral branch over the other of transformer 222 will provide a D.C. voltage differential across windings 251a, 251b of inductor 252, with the higher voltage and its polarity being associated with the neutral system carrying the higher current value. This voltage differential is applied to a compensating winding 245 associated with power saturable reactors 237, 239 which is connected to the junction point between windings 234 and 251b, respectively. The exciting current in winding 245 will then be proportional to the voltage differential which exists between windings 251a, 251b which, in turn, is proportional to the unbalanced current flowing in the two neutral systems of secondary windings 228, 229. Winding 245 has a polarity with respect to reactors 237, 239 such that the exciting current therein operates to bias power saturable reactors 237, 239 in such a manner as to bring the two neutral systems into balance. Thus, in operation, any excess current in, for example, secondary windings 228 will cause an increased voltage drop across winding 251a of filter inductor 252, which in turn operates to increase the bias current in winding 245 and corresponding increase in bias M.M.F. in saturable reactor 239, thus causing an increase in current in the neutral system of winding 229 to bring the system into balance. It has been found by actual tests that, in accordance with this feature of the invention, no significant switching between secondary windings can be observed and circuit balance is closely maintained.

A further feature of the invention is the provision of means for reducing radio noise to a minimum. It has been found that one of the major sources of radio noise in an A.C. to D.C. conversion system is generated in the power rectifying devices which produce pulse currents as a function of their commutation characteristics, and that the accumulation of these pulses produces, in systems which utilize a plurality of power diodes, an excessive amount of radio noise. By providing a conversion circuit in which rectifiers 240a, 240b and 240c and 241a, 241b, 241c are grounded, and by connecting capacitors 410, 412, 416, 418, 420, 422 between windings 258, 236a, 236b, 236c, 238a, 238b, 238c, and ground, respectively, the inductor windings 236, 238 and capacitors 410-422 cooperate to form an effective low-pass filter in each of their associated circuits with noise effectively squelched at the source. Power windings 236, 238, even when fully saturated, have sufficient residual inductance for effective operation as a filter element.

Current sensor unit 216 which operates similarly to unit 16 of the single phase embodiment of FIG. 1 will now be described briefly. Power saturable reactors 237, 239 have a pair of control windings 242, 244 which are connected to D.C. output line 250 and resistors 318, 316 in preamplifier unit 212, respectively. Current sensor 216 has a current responsive control winding 258 connected in series with load current supply line 250, which is the control winding for output windings 260a, 260b, 260c of saturable reactor 261. It will be understood that saturable reactor 261 may comprise one or more saturable reactors but, for purposes of illustration and to simplify the drawings, three output windings having a common control winding are shown. Each of the output windings 260a, 260b, and 260c of reactor 261 is connected to A.C. output terminals 232a, 232b, 232c, respectively, of the secondary winding 229 of power transformer 222, and also connected through associated load resistors 264a, 264b, 264c to output line 250. Diodes 268a, 268b, 268c are respectively connected to the junction point of windings 260a, 260b, 260c and resistors 264a, 264b, 264c. Diodes 268a, 268b, 268c have a common junction connection through resistor 272 to junction terminal 274 in logic unit 214. A resistor 276 connected to terminal 274 and line 250 form a conventional voltage divider with resistor 272. As in the single phase embodiment described above, a D.C. voltage is available at junction 274 which is proportional to the current passing through control winding 258 of current sensor 216 and is therefore proportional to the load current of the battery being charged.

Voltage sensor 218 which operates similarly to voltage sensor 18 of FIG. 1, has a pair of output terminals 248, 249 which provide positive and negative output connections for the charging system. Connected across terminals 248, 249 are serially connected voltage dividing resistors 278, 280. A diode 282 is connected to the junction points between resistors 278, 280 and to a resistor 294 which in turn is connected to control winding 288 of saturable reactor 287 through an adjustable resistor 295, which may be used to adjust the excitation thereto. As in the case with the single phase embodiment described above, the excitation of the control winding 288 is proportional to the magnitude of the output voltage and, thus, the terminal voltage of the battery being charged. Comparison of the load line current with the load voltage is performed at junction 284. Excitation of the control winding 288 is dependent upon the differential voltage resulting therebetween.

A source of reference voltage is provided by reference unit 220 which comprises serially connected zener diodes 302a, 302b, 302c connected to resistor 308, which in turn is connected to a common junction point of resistors 306a, 306b, 306c. The other ends of resistors 306a, 306b, 306c are respectively connected to diodes 304a, 304b, 304c which are in turn connected to terminals 232a, 232b, 232c of power transformer secondary 229. The reference output voltage developed across zener diodes 302a, 302b, 302c excites a reference winding 296 of power control saturable reactor 288 through resistor 298. Output voltage and/or current control of saturable reactor 288 in preamplifier 212 is provided as described above in connection with the description of the operation of saturable reactor 87 of preamplifier unit 12, by balancing the M.M.F. developed by winding 292 against that provided by load condition sensing winding 288. When the M.M.F.'s developed by each winding are in balance, the charging system is operating either at rated output current or at rated terminal voltage as required by the charge condition of the battery.

The joined ends of secondary windings 290a, 290b, 290c of saturable reactor 288 are connected through a resistor 316 to control winding 244 associated with power reactors 237, 239. One end of winding 244 is connected to load current line 250. A controllable bias current for control winding 240 is provided by connecting the unjoined ends of windings 290a, 290b, 290c through diodes 312, 313, 314 to terminals 232a, 232b, 232c. Variations in the magnitude of the exciting current in control winding 288 of saturable reactor 287, which deviate from the reference M.M.F. established by winding 296, will be reflected as a change in excitation current through control winding 244 of the power reactors 237, 239. M.M.F. balancing for the power saturable reactors is provided by means of a separate balancing winding 242 in a manner similar to the balancing provided for preamplifier saturable reactor 287. Thus, winding 242 is serially connected to load line 250, and through resistor 318 to junction point 319, at which the zener reference voltage appears. Control of the output load current and voltage is thus achieved by balancing the M.M.F. of winding 244 against the reference M.M.F. provided by winding 242 in a manner similar to that described hereinabove in connection with the operation of saturable reactors 37, 39 of FIG. 1.

Reference winding 292 of saturable reactor 287 is shunted by a resistor 325 to provide temperature compensation for the system in the same manner as described above in connection with winding 96 of saturable reactor 88 (FIG. 1).

The foregoing has described preferred embodiments of the invention but modifications may occur to those skilled in the art without departing from the spirit of the invention, and it is to be understood that the scope of the present invention is to be limited only by the appended claims.

What is claimed is:

1. A rectified current supply system for controlling the flow of current from a source of variable voltage to a load comprising, a source of A.C. voltage, a rectifying circuit having an A.C. input connected to said source and D.C. output voltage terminals for applying said D.C. output voltage to a load, output voltage control means connected between said A.C. source and said rectifying circuit, said output voltage control means including a saturable core reactor having a control winding, and a bias winding, a source of constant reference voltage connected to said bias winding and operative to generate a reference M.M.F. in the core of said reactor for saturating said reactor in a direction effective to increase said output voltage, means connected to said output terminals for deriving a signal representative of the load voltage appearing across said terminals, means connected to the output of said rectifying circuit and operative to derive a signal representative of the current drawn by said load, means connected to said load voltage signal deriving means and said load current signal deriving means and operative to compare said signals with each other, means connected to said comparing means and operative to apply a voltage representative of the compared signal having the greatest magnitude to said control winding of said saturable core reactor to control the output voltage of said rectifying circuit so that the output voltage of said rectifying circuit is load voltage or load current controlled, said control winding being operative to generate an M.M.F. in the core of said reactor in opposition to said reference M.M.F. so that said output voltage is decreased as said opposing M.M.F.'s approach a balanced condition, and signal limiting means including a source of D.C. voltage of constant value connected to said comparing means and operative to prevent said voltage representative of compared signals from exceeding a predetermined magnitude and overcontrolling said saturable reactor.

2. The invention defined in claim 1 including gating means connected to said control winding and operative to apply said signal limiting means thereto whenever said load current signal exceeds a predetermined magnitude.

3. A rectified current supply system for controlling the flow of current from a source of variable voltage to a load comprising, a source of A.C. voltage, a rectifying circuit having an A.C. input connected to said source and D.C. output voltage terminals for applying said D.C. output voltage to a load, output voltage control means connected between said A.C. source and said rectifying circuit, said output voltage control means including a saturable core reactor having a control winding and a bias winding, a source of constant reference voltage connected to said bias winding and operative to generate a reference M.M.F. in the core of said reactor for saturating said reactor in a direction effective to increase said output voltage, means connected to the output of said rectifying circuit and in series with said load and operative to derive a signal representative of the current drawn by said load, means connected to said load current signal deriving means and operative to apply said signal to said control winding of said saturable core reactor to control the output voltage of said rectifying circuit in accordance with changes in said load current, said control winding being operative to generate an M.M.F. in the core of said reactor in opposition to said reference M.M.F. so that said output voltage is decreased as said opposing M.M.F.'s approach a balanced condition, and means connected to said control winding and operative to limit the maximum value of said opposing M.M.F. to a value effective to substantially desaturate said core and minimize said output voltage.

4. A rectified current supply system for controlling the flow of current from a source of variable voltage to a load comprising, a source of A.C. voltage, a rectifying circuit having an A.C. input connected to said source and D.C. output voltage terminals for applying said D.C. output voltage to a load, output voltage control means connected between said A.C. source and said rectifying circuit, said output voltage control means including a saturable core reactor having a control winding and a bias winding, a source of constant reference voltage connected to said bias winding and operative to generate a reference M.M.F. in the core of said reactor for saturating said reactor in a direction effective to increase said output voltage, means connected to said output terminals for deriving a signal representative of the load voltage appearing across said terminals, means connected to the output of said rectifying circuit and operative to derive a signal representative of the current drawn by said load, means connected to said load voltage signal deriving means and said load current signal deriving means and operative to compare said signals with each other, means connected to said comparing means and operative to apply a voltage representative of the compared signal having the greatest magnitude to said control winding of said saturable core reactor to control the output voltage of said rectifying circuit so that said output voltage is load voltage or load current controlled, said control winding being operative to generate an M.M.F. in the core of said reactor in opposition to said reference M.M.F. so that said output voltage is decreased as said opposing M.M.F.'s approach a balanced condition, said means for deriving said load current signal comprising a second saturable core reactor having a control winding connected in series with said output load circuit so that said load current passes therethrough and having at least one A.C. winding connected to said source of A.C. supply, rectifying means connected to said A.C. winding and operative to produce a signal representative of said load current, the output of said rectifying means being connected to said comparing means.

5. A rectified current supply system for controlling the flow of current from a source of variable voltage to a load comprising, a source of A.C. voltage, a rectifying circuit having an A.C. input connected to said source and D.C. output voltage terminals for applying said D.C. output voltage to a load, output voltage control means connected between said A.C. source and said rectifying circuit, said output voltage control means including a saturable core reactor having a control winding, and a bias winding, a source of constant reference voltage connected to said bias winding and operative to generate a reference M.M.F. in the core of said reactor for saturating said reactor in a direction effective to increase said output voltage, means connected to said output terminals for deriving a signal representative of the load voltage appearing across said terminals, means connected to the output of said rectifying circuit and operative to derive a signal representative of the current drawn by said load, means connected to said load voltage signal deriving means and said load current signal deriving means and operative to compare said signals with each other, said comparing means comprising a control circuit connected to said control winding and having an input terminal, a first diode connected between said terminal and said voltage sensing means and effective when conductive to apply a signal representative of said load voltage to said terminal, a second diode connected to said terminal and said current sensing means and effective when conductive to apply a signal to said terminal representative of said load current, the diode having the signal of greatest magnitude applied thereto being operative to energize said control winding and generate an M.M.F. in the core of said reactor in opposition to said reference M.M.F. so that said output voltage is decreased as said opposing M.M.F. approach a balanced condition, a source of D.C. reference voltage of constant value associated with said comparing means, and a third diode serially connected between said source of D.C. reference voltage and said second diode and operative to conduct and apply said D.C. voltage to said terminal to clamp said terminal to said D.C. voltage value whenever said load current signal exceeds the magnitude of said D.C. voltage, whereby overcontrolling of said saturable core reactor is prevented.

6. A rectified current supply system for controlling the flow of current from a source of variable voltage to a load comprising, a source of A.C. voltage, a rectifying circuit having an input connected to said source and D.C. output voltage terminals for connection to a load, a saturable core reactor having a power winding connected in series with said A.C. source and said rectifying circuit and having a control winding and a bias winding, a source of bias voltage connected to said bias winding and operative to generate an M.M.F. to establish said reactor in a substantially unsaturated state, a preamplifier saturable core reactor having an output winding connected to said control winding of said power saturable reactor and operative to drive said power reactor towards a saturated state, said preamplifier reactor having a reference winding and a control winding, a source of reference voltage of constant value connected to said reference winding and operative to drive said preamplifier reactor towards a saturated state and establish a reference M.M.F. therein, said source of reference voltage including a circuit comprising at least one zener diode, and rectifying means connected between said diode and said source of A.C. for causing a current to flow through said zener diode, said reference winding being connected across said zener diode and energized by the voltage developed thereacross, means connected to said output terminals for deriving a signal representative of the load voltage appearing across said terminals, and means connected to said signal deriving means for applying said signal to said control winding of said preamplifier reactor to generate an M.M.F. in the core of said reactor in opposition to said reference M.M.F. and drive said reactor towards an unsaturated state, whereby the output voltage of said rectifying circuit is decreased as said load voltage is increased.

7. A rectified current supply system for controlling the flow of current from a source of variable voltage to a load comprising, a source of A.C. voltage, a rectifying circuit having an input connected to said source and D.C. output voltage terminals for connection to a load, a saturable core reactor having a power winding connected in series with said A.C. source and said rectifying circuit and having a control winding and a bias winding, a source of bias voltage connected to said bias winding and operative to generate an M.M.F. to establish said reactor in a substantially unsaturated state, a preamplifier saturable core reactor having an output winding connected to said control winding of said power saturable reactor and operative to drive said power reactor towards a saturated state, said preamplifier reactor having a reference winding and a control winding, a source of reference voltage of constant value connected to said reference winding and operative to drive said preamplifier reactor towards a saturated state and establish a reference M.M.F. therein, means connected to said output terminals for deriving a signal representative of the load voltage appearing across said terminals, and means connected to said signal deriving means for applying said signal to said control winding of said preamplifier reactor to generate an M.M.F. in opposition to said reference M.M.F. and drive said preamplifier reactor towards an unsaturated state whereby the output voltage of said rectifying circuit is decreased as said load voltage is increased, said control winding of said preamplifier saturable reactor having a zero temperature coefficient resistor connected in shunt therewith to prevent a rise in output voltage with an increase in ambient temperature of said system.

8. A rectified current supply system for controlling the flow of current from a source of variable voltage to a load comprising, a source of A.C. voltage, a rectifying circuit having an input connected to said source and D.C. output voltage terminals for connection to a load, a saturable core reactor having a power winding connected in series with said A.C. source and said rectifying circuit and having a control winding and a bias winding, a source of bias voltage connected to said bias winding and operative to generate an M.M.F. to establish said reactor in a substantially unsaturated state, a preamplifier saturable core reactor having an output winding connected to said control winding of said power saturable reactor and operative to drive said power reactor towards a saturated state, said preamplifier reactor having a reference winding and a control winding, a source of reference voltage of constant value connected to said reference winding and operative to drive said preamplifier reactor towards a saturated state and establish a reference M.M.F. therein, means connected to said output terminals for deriving a signal representative of the load voltage appearing across said terminals, means connected to said rectifying circuit and operative to derive a signal representative of the current drawn by said load, means connected to said load voltage signal deriving means and said load current signal deriving means and operative to compare said signals with each other, said comparing means comprising a control circuit for said control winding of said preamplifier reactor and having an input terminal, a first diode connected between said terminal and said voltage sensing means and effective when conductive to apply a signal representative of said load voltage to said terminal, a second diode connected to said terminal and said current sensing means and effective when conductive to apply a signal to said terminal representative of said load current, the diode having the signal of greatest magnitude applied thereto being operative to energize said control winding and generate an M.M.F. in the core of said reactor in opposition to said reference M.M.F. so that said output voltage is decreased as said opposing M.M.F.'s approach a balanced condition, a source of D.C. reference voltage of constant value associated with said comparing means, a third diode serially connected between said source of D.C. voltage and said second diode and operative to conduct and apply said D.C. voltage to said terminal whenever said load current signal exceeds the magnitude of said D.C. voltage, whereby overcontrolling of said preamplifier saturable core reactor is prevented.

9. A rectified current supply system for controlling the flow of current from a source of variable voltage to a load comprising, in combination, a source of A.C. voltage, a rectifying circuit connected to said A.C. source and having a plurality of rectifying means and a D.C. output voltage terminal for connection to a load, an input transformer having a primary winding connected to said A.C. source and having at least two groups of secondary windings, each group having first and second output terminals, each of said first terminals being connected to one of said rectifying means, saturable core reactor elements serially connected between each of said first terminals and said associated rectifying means and having control windings and compensating windings, a filter inductance having a plurality of windings, a first end of said filter windings being commonly connected to said D.C. output terminal of said rectifying circuit, a second end of said filter windings each being connected to one of said groups of transformer secondary windings to allow load current to flow therethrough, said compensating windings being connected to said second ends of said filter windings and operative in response to the difference in potential developed thereacross by load current flowing through said filter inductance windings, to selectively vary the saturation of said reactors to compensate for differences in the magnitude of the load currents flowing through said groups of secondary windings, and output circuit means connected to each of said reactor control windings and operative to selectively vary the output voltage of said system.

10. A rectified current supply system for controlling the flow of current from a source of variable voltage to a load comprising, in combination, a source of multiphase A.C. voltage, an input transformer having a primary winding connected to said A.C. source and having at least two groups of secondary windings, each group having first and second output terminals, each of said first terminals being connected to one of said rectifying means, saturable core reactor elements serially connected between each of said first terminals and said associated rectifying means and having control windings, an interphase transformer having a plurality of windings with one end of each winding having a common output connection to said D.C. output terminal, a second end of each of said interphase transformer windings being connected to one of said second output terminals of said groups of said transformer secondary windings to allow load current to flow therethrough, said interphase transformer having a core with an air gap therein, said core and said air gap being dimensioned to cause the load current flowing in said interphase transformer windings to saturate said core during a substantial portion of the current conduction period for each alternation of said multiphase voltage, whereby unwanted line current harmonics are reduce to a minimum, and output circuit means connected to each of said reactor control windings and operative to selectively vary the output voltage of said system.

11. The invention defined in claim 10 wherein said core of said interphase transformer is dimensioned so that the conduction angle of the load current flowing in said interphase transformer windings is no greater than substantially 85% of the total conduction angle for each alternation of said multiphase A.C. voltage.

12. A rectified current supply system for controlling the flow of current from a source of variable voltage to a load comprising, a source of A.C. voltage, a rectifying circuit connected to said A.C. source and having at least one rectifying element and D.C. output voltage terminals for connection to a load, said rectifying element having a connection to a point of ground potential for said system, a saturable core reactor having a power winding connected between said A.C. source and said rectifying element and having a control winding, output circuit means connected to said terminals and said control winding and operative to selectively vary the output voltage of said rectifying circuit in response to variations of a predetermined magnitude of the voltage appearing across said load, and a capacitor connected between a point of ground potential for said system and the junction connection of said reactor power winding and said A.C. source, the inductance of said reactor, said grounded rectifying element and capacitance of said grounded capacitor forming a low pass filter for by-passing to ground the high frequency components of the output voltage supplied by said system, to prevent radiation of said components as radio noise interference.

References Cited in the file of this patent

UNITED STATES PATENTS

| | | |
|---|---|---|
| 2,634,394 | Kohler | Apr. 7, 1953 |
| 2,673,324 | Burton et al. | Mar. 23, 1954 |
| 2,825,864 | Eagan | Mar. 4, 1958 |
| 2,875,395 | Blashfield | Feb. 24, 1959 |
| 2,875,396 | Christie et al. | Feb. 24, 1959 |
| 2,914,720 | Merkel | Nov. 24, 1959 |

OTHER REFERENCES

"Magnetic Amplifiers," by Vickers Electric Division, Bulletin No. VT-2000 (1948); FIGURE 41, pages 23-25 relied on.